E. KUHNS,
Assignor to B. KUHNS.
Grain-Drill.
No. 9,066. Reissued Feb. 3, 1880.
*FIG. 1.*
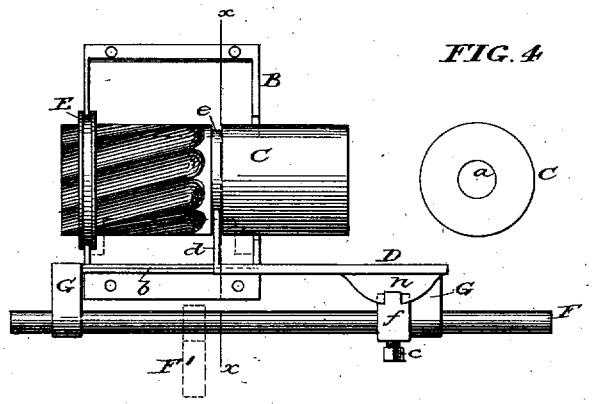
*FIG. 3.*
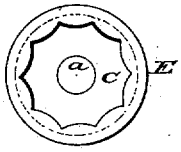
*FIG. 4*
*FIG. 2.*
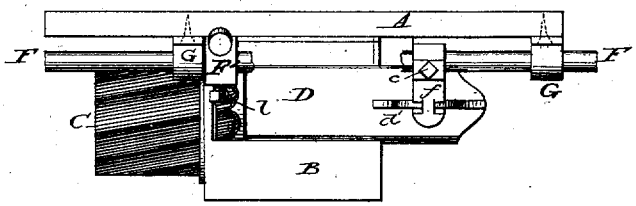
*FIG. 5.*
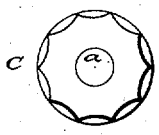
*FIG. 6.*
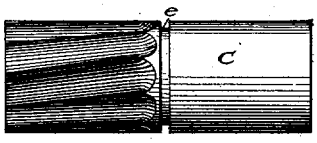
*FIG. 7.*
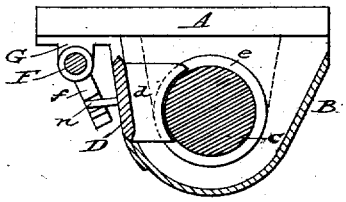
*Witnesses,*
Sidney P. Hollingsworth
William W. Dodge,
*Inventor.*
E. Kuhns,
by Dodger & Son,
Attys.
N. PETERS, PHOTO-LITHOGRAPHER, WASHINGTON, D. C.

UNITED STATES PATENT OFFICE.

EDWARD KUHNS, OF LOGANSPORT, IND., ASSIGNOR TO BENJAMIN KUHNS.

GRAIN-DRILL.

SPECIFICATION forming part of Reissued Letters Patent No. 9,066, dated February 3, 1880.

Original No. 171,907, dated January 4, 1876. Application for Reissue filed December 22, 1879

*To all whom it may concern:*

Be it known that I, EDWARD KUHNS, of Logansport, in the county of Cass and State of Indiana, have invented certain new and useful Improvements in Grain-Drills; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to that class of grain-drills in which the grain is fed or forced out of the seed-cups by means of grooves on the periphery of the cylinders, and in which the feed-cylinders are adjusted by sliding them longitudinally through the sides of the cups; and the invention consists in the combination, with the sliding or adjustable feed-cylinders, of a gate for each seed-cup, so arranged in relation to the cylinder that both the cylinder and the gate shall be adjusted or moved by one and the same operation, for the purpose of closing or opening (more or less) the passage in the seed-cup through which the grain is fed out, and thereby regulating the feed with accuracy, and, in connection therewith, of devices for operating the cylinders and gates, all as hereinafter more fully described.

Figure 1 is a top-plan view of a single seed-cup, cylinder, gate, and operating devices, shown detached from the hopper. Fig. 2 is a rear elevation of the same, in position under the hopper-bottom. Fig. 3 is an end view of the grooved portion of the cylinder and the rotating disk through which that portion of the cylinder slides when moved to adjust or change the feed; Fig. 4, an end view of the opposite end of the cylinder. Figs. 5 and 6 are an end and side view, respectively, of the feed-cylinder detached; and Fig. 7 is a transverse vertical section on the line *x x* of Fig. 1.

In the various figures, A represents the bottom of the hopper, said bottom being omitted from Fig. 1, for the purpose of more clearly showing the seed-cylinder and gate. B represents the seed-cup, C the cylinder, and D the gate.

The seed-cup B is provided with a flange, through which screws pass to fasten it in place to the under side of the hopper-bottom, in the usual manner.

The seed-cylinder C is about twice as long as the seed-cup B is wide, as shown in Fig. 1, and it is divided into two parts by a circumferential groove, *e*, as shown in Fig. 6, that portion of the cylinder at one side of this groove *e* being smooth, while that portion on the opposite side of the groove is provided with a series of longitudinal grooves, arranged obliquely or spirally, as shown, for the purpose of forcing or feeding the grain out of the seed-cup B, which has an opening or mouth at its rear side for the grain to pass out at. The cylinder is made of such a diameter in relation to the seed-cup, within which it rotates, as to leave a channel or throat for the passage of the grain between the periphery of the cylinder and the surrounding wall of the cup, as shown clearly in Fig. 1.

The cylinder C is provided with a longitudinal central hole, *a*, through which a rod (not shown) is inserted to give motion to cylinders, as usual in this style of machines. The smooth portion of the cylinder bears in a hole in one side of the cup, while the grooved portion passes through a disk, E, having a central hole corresponding in shape to the grooved periphery of the cylinder, as shown in Fig. 3, this disk or collar E having a groove around its edge, as shown, whereby it is prevented from moving sidewise, but is permitted to turn freely with the cylinder in its seat in the side of the cup B, as represented in Fig. 1, this grooved disk, in connection with a grooved or ribbed feed-cylinder, being a well-known device.

In the drawings, the gate D is represented as a flat plate arranged to slide longitudinally, as represented in Figs. 1 and 2, so as to close the throat or channel through which the grain is fed out of the cup more or less, as may be desired, and it is provided with an inwardly-projecting arm, *d*, the inner end of which fits loosely in the groove *e* of cylinder C, so that if either the cylinder or the gate be moved the other must be moved with it, and thus the size of the throat or passage through which the grain is fed out will always be made to correspond with that portion of the cylinder within the cup which is operating upon the grain to force it out—that is to say, with the grooved portion of the cylinder that remains within the cup when the cylinder is moved or adjusted longitudinally, the smooth portion of the cylinder having no effect upon the grain so far as the feeding or forcing of it out is concerned, it operating merely as a bearing for that end of the cylinder and to keep the hole in the side of the cup closed, so that the grain shall not escape through it. The arm *d* of the gate D not only serves as a means for connecting the gate and cylinder, but it also forms a transverse partition within the cup, and to a greater or less extent serves to prevent the grain from passing from under the smooth to the grooved portion of the cylinder, and thereby aids to more effectually regulate the feed.

In rear of the seed-cups is mounted a rod, F, which is supported by brackets or boxes G in such a manner that the rod may be readily moved to and fro by a handle, F′. (Shown in dotted lines in Fig. 1 and in full lines in Fig. 2.) As shown in Fig. 7, the boxes or supports G may be cast with the seed-cups, and as a part thereof, if desired, there being one for each cup, the effect of this being to keep the supports G always in line with the cups B, and render the rod less likely to bind in its supports or bearings.

Each gate D is connected to this rod F by means of an arm, *f*, which is secured upon the rod by a set-screw, *c*, so they can be accurately adjusted in such a manner as to make all the gates in the series operate precisely alike, and thus regulate the feed from each cup with perfect uniformity. At their lower ends these arms *f* are connected to the gates D by fitting in a notch in a lug, *n*, projecting from the rear face of the gate near one end, as shown in Figs. 2 and 7. These arms *f* also serve as a stop when opening the gates by being arranged to come in contact with the box or support G, as represented in Fig. 1, in which the gate and cylinder are shown adjusted for a large feed, while in Fig. 2 they are shown adjusted for a small feed, the former representing the feed-channel as being opened for about three-fourths of the width of the cup, and the latter showing it opened for about one-fourth of said width.

The handle F′, being secured by a set-screw, *l*, as shown in Fig. 2, can also be adjusted upon the rod F so as to strike against the support G at its left, as shown in Fig. 2, and thus be made to serve as a stop for the series of gates when moved in that direction, and by properly adjusting it in accordance with the feed desired the cylinders and gates can be at once brought to the exact position required for any given feed.

While I have shown but a single cup-cylinder and gate, it will, of course, be understood that a series of them are to be used, as usual in grain-drills, the arrangement of each one in the series being the same as that shown.

The operation of the device is as follows: The hopper above the cup, which is not shown, is supplied by seed, which flows into the cup. The revolution of the cylinder causes the seed in that part where the spiral grooves are to pass upward to the opening, it being lifted or forced out by the grooved portion of the cylinder, the smooth portion sliding over the grain, the gate regulating the size of the outlet, and the partition or arm *d* also acting to hold back the grain which is under the smooth portion of the cylinder.

By simply moving the cylinder and gate the feed may be changed at will, as desired.

Having thus described my invention, what I claim is—

1. The combination, in a grain-drill, of the following elements: first, a seed-cup; second, a feed-cylinder mounted and adapted to be adjusted laterally therein and provided with grooves for feeding out the grain; and, third, a gate for closing the channel or outlet through which the grain is forced from the cup, said cylinder and gate being connected so that both shall be moved or adjusted for regulating the feed by one and the same operation.

2. The combination, in a grain-drill, of the following elements: first, a seed-cup; second, a sliding or adjustable feed-cylinder mounted therein, with an unobstructed channel between its periphery and the adjoining wall of the cup for the passage of the grain; and, third, a gate for closing the channel or outlet through which the grain is fed out of said cup, the said cylinder and gate being connected and adapted to be moved or adjusted to regulate the feed by one and the same operation.

3. A feed-wheel having one portion grooved for feeding out the grain and the other portion smooth, the two portions being separated by an annular groove, *e*, as and for the purpose set forth.

4. In combination with the longitudinally-adjustable feed wheel and gate, the sliding rod F, mounted in supports and arranged to simultaneously move or adjust both the cylinder and the gate, substantially as described.

5. In combination with the longitudinally-adjustable feed cylinder and gate, the arm or partition *d*, arranged to operate substantially as described.

EDWARD KUHNS.

Witnesses:
A. V. BOND,
CHARLES E. COFFIN.